United States Patent Office 3,355,609
Patented Nov. 28, 1967

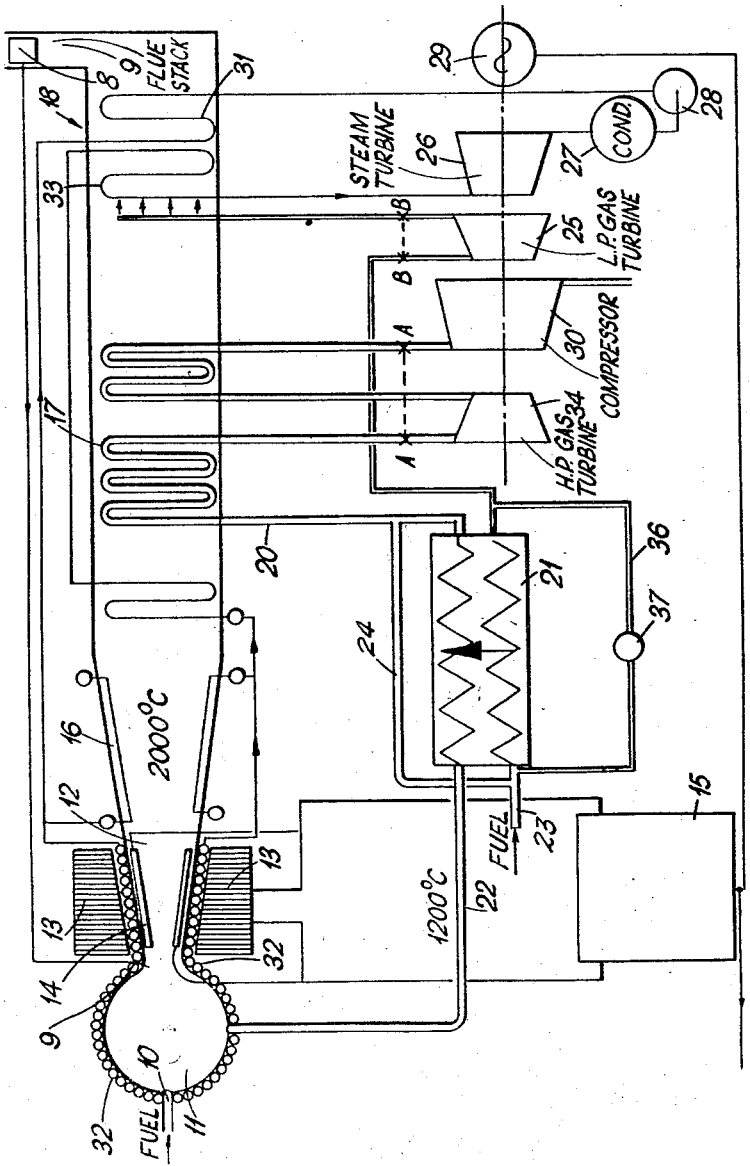

3,355,609
MAGNETOHYDRODYNAMIC ELECTRICAL
GENERATORS
George Horn, Milford-on-Sea, and Boguslaw Chojnowski, Romsey, England, assignors to Central Electricity Generating Board, London, England, a British body corporate
Filed Apr. 19, 1965, Ser. No. 449,016
Claims priority, application Great Britain, Apr. 28, 1964, 17,609/64
7 Claims. (Cl. 310—11)

ABSTRACT OF THE DISCLOSURE

In an MHD electrical generator operating on an open cycle with fuel burnt in combustion air to provide combustion gases which are passed through the MHD duct, this air is preheated in two stages; the first stage makes use of a heat exchanger in the outlet from the MHD duct and the second stage uses an independently fired preheater. The latter can be a ceramic heat exchanger with the air and heating gases at substantially the same pressure.

---

This invention relates to magnetohydrodynamic generators of the open cycle type in which a fuel is burnt with pre-heated air to provide high temperature combustion gases which are passed through the magnetohydrodynamic duct across which a magnetic field is applied whereby electrical power may be taken from spaced electrodes.

In such apparatus, it is necessary for the combustion gases in the duct to have a very high temperature, typically of the order of 2,500° C. to 3,000° C., in order that the gases should be conductive. To achieve such a temperature, the combustion air has to be pre-heated to a temperature which might typically be of the order of 1,200° C. A first stage of pre-heating may be effected by a pre-heater using the heat in the exhaust gases from the magnetohydrodynamic duct. It is not generally practicable however to heat the combustion air completely to the required high temperature by such a pre-heater and the present invention is directed more particularly to a second stage of pre-heating.

According to this invention, in a magnetohydrodynamic electrical generator operating on an open cycle with fuel burnt in combustion air to provide combustion gases which are passed through a magnetohydrodynamic duct, there are provided a compressor for compressing air and passing it through a heat exchanger in the outlet from the magnetohydrodynamic duct for first stage pre-heating, and an independently fired pre-heater for the compressed air whereby clean compressed heated air is provided as said combustion air. By an independently fired pre-heater is meant a pre-heater in which the heat is obtained via a heat exchanger from a heat source burning fuel independently of the combustion process producing the hot gases for the generator system. Preferably the independently fired pre-heater is heated by fuel burning in air taken from said compressor so that the pressure on the combustion side and of the air to be heated in said independently fired pre-heater are substantially equal. The air to be utilised for combustion in the independently fired pre-heater may itself be pre-heated, for example, by using air after it has passed through the aforementioned heat exchanger in the outlet from the generator duct.

By using an independently fired pre-heater, the difficulties caused by the corrosive properties of combustion gases in the pre-heater are avoided. This is particularly important if the combustion gases in the magnetohydrodynamic generator duct have to be seeded, for example with a chemical compound containing potassium, since the combustion products then are very corrosive. Furthermore the possibility of blockages in the gas passage in the pre-heater are very greatly reduced and it is possible to employ smaller passages; the size of the whole plant may thereby be substantially reduced and this may lead to a substantial economy. This independently fired pre-heater may be of any type but, generally speaking, whatever the type, further advantages arise if there is no pressure differential between the air and the heating gases in the pre-heater. For example, if it is a tubular pre-heater, a much thinner tube may be used if there is no pressure differential. The independently fired pre-heater may typically comprise a heat exchanger of the regenerative type with a moving matrix or the tubular ceramic recuperative type. With heat exchangers of this type, there need not be any large pressure differential between the air being heated and the combustion products employed for heating this air. Thus valves are unnecessary and a uniform outlet temperature and pressure may be achieved. These factors may be important for the efficiency of the whole magnetohydrodynamic electrical generator system. Moreover, even if a regenerative heat exchanger system with a stationary matrix is employed, the design of valves is simplified and leakage avoided. The use of an independently fired pre-heater moreover makes the system more flexible to operate and, in particular, eliminates any need for an auxiliary unit for starting up the system.

Provision may be made for recirculating a controllable proportion of the combustion gases leaving said independently fired pre-heater back to the inlet to that pre-heater whereby the combustion gas temperature at the inlet may be controlled.

After leaving the pre-heater, the remaining energy in the combustion gases used for heating purposes in the pre-heater may be utilised in any convenient manner. For example, these gases may be employed to drive a gas turbine or for steam raising or steam superheating. In one convenient arrangement the gases are fed through a gas turbine and the output gases from this gas turbine are used in a steam superheater. This steam superheater may be arranged in the outlet flue from the magnetohydrodynamic generator, the gases from the gas turbine being fed into this outlet flue.

The air from the compressor, as previously described, is fed through a heat exchanger in the magnetohydrodynamic generator outlet duct before passing to the independently fired pre-heater. In some cases it may be preferred to have two stages of pre-heating in the outlet duct with the heated compressed air, after the first stage, being used to drive a turbine before being reheated.

One embodiment of the invention is illustrated in the accompanying drawing which illustrates diagrammatically a magnetohydrodynamic electrical generator and in which typical temperatures are marked at various points on the drawing purely by way of example.

Referring to the drawing, fuel, e.g. oil, gas or coal, from a pipe 10 is fed into a combustion chamber 11 where it is burnt with hot compressed air produced in a manner to be described later to produce combustion gases which are passed through a magnetohydrodynamic duct 12. Provision may be made, in the known way, for introducing a seeding material such as a chemical compound containing potassium to increase the conductivity of the combustion products which pass out through the duct 12; this seed material may be recovered before the gases are finally exhausted to the atmosphere. In the drawing, the seed recovery means is indicated diagrammatically at 8 and the seed material is injected at 9. A magnetic field is applied across the duct 12 at right angles to the plane of the paper by a magnet indicated diagrammatically at 13 and an electrical output is taken from electrodes 14 and fed to a D.C. to A.C. inverter 15. The gases from the duct 12 pass first through a section 16 where some of their remaining heat is extracted for steam raising and thence pass to an air pre-heater 17. Beyond the air preheater 17 the gases pass to a superheating unit 18 before being discharged through a flue stack 19. The air pre-heater 17 heats air which has been compressed by a compressor 30. To get the required high temperature of the combustion products in the duct 12, the combustion air fed to the chamber 11 must be at a much higher temperature, typically 1200° C., than is obtainable by using the pre-heater 17 and for this purpose the hot compressed air from the pre-heater 17 is passed through a pipe 20 to a second stage pre-heater 21 and thence through a pipe 22 to the combustion chamber 11. The second stage pre-heater is independently fired, that is to say the air is heated without any mixing with combustion products. This air-heater 21 may be typically a recuperative heat exchanger using ceramic tubes or a regenerative type heat exchanger with a stationary or moving matrix. To ensure that there is no pressure differential between air being heated and the heating medium, the air heater 21 is fired with fuel introduced at 23 and burnt with pressurised combustion air taken from the pre-heater 17 through a pipe 24. The pressures of the combustion products in the pre-heater 21 and of the air being heated are the same so avoiding any necessity for valves to prevent leakage of pressurised air. The combustion gases from the pre-heater 21 are utilised to drive a low pressure gas turbine 25 and finally released into the outlet duct for steam superheating in the steam raising and superheating unit 18. The steam from this unit is illustrated diagrammatically as being fed to a steam turbine 26, from the low pressure end of which it passes to a condenser 27 and pump 28 for re-circulation. The gas turbine 25 and steam turbine 26 drive an alternator 29 and the compresor 30 which compresses air fed into the preheater 17.

In the particular example illustrated, part of the water from the condenser after passing through a heat exchanger 31 (forming part of the steam raising and superheating unit 18) is employed for cooling purposes to cool the walls of the duct 12 and combustion chamber, as indicated diagrammatically by the cooling tubes 32. The remainder of the water is fed through the aforementioned steam raising section 16. All the steam from this steam raising section 16 and from the duct and combustion chamber cooling system is fed back to a heat exchanger 33 (also forming part of the steam raising and superheating unit 18).

In the particular example illustrated, the compressor 30 compresses the air to a pressure several times higher than that required in the MHD generator duct 12, and after a first stage of pre-heating in the pre-heater 17, the compressed air is passed through a high pressure gas turbine 34. The air is then again passed to the pre-heater 17 before going to the heat exchanger 21.

Preferably, provision is made, as shown at 36 for the recirculating of gases leaving the pre-heater 21. As indicated diagrammatically at 37, means are provided for controlling the amount of the combustion gases recirculated. This enables the combustion gas temperature at the inlet to the pre-heater 21 to be controlled.

It will be appreciated that the drawing is illustrative of one example and many modifications of this arrangement are possible. For example it may be preferred not to have the high pressure gas turbine 34 and the low pressure gas turbine 25, the combustion gases from the pre-heater 21 being fed to the steam raising and superheating unit directly as indicated by the dashed lines AA and BB. The use of one or both gas turbines however provides more efficient means of converting the thermal energy in the combustion gases to electrical output and for recovering the pressure energy in the combustion products from the air pre-heater 21.

We claim:

1. In a magnetohydrodynamic electrical generator operating on an open cycle with fuel burnt in combustion air to provide combustion gases which are passed through a magnetohydrodynamic duct; the combination of a compressor for compressing air, a first stage pre-heater comprising a heat exchanger in the outlet from said magnetohydrodynamic duct arranged to heat said compressed air and an independently fired pre-heater for further pre-heating the air from said first stage pre-heater to provide said combustion air, said independently fired pre-heater comprising means for burning fuel in part of the air taken from said compressor to heat the remaining part of the air so that the pressure on the combustion side and of the air to be heated in said independently fired pre-heater are substantially equal.

2. In a magnetohydrodynamic electrical power generator; the combination of a combustion chamber, means for feeding fuel into said chamber, a magnetohydrodynamic duct through which combustion gases from said combustion chamber are passed, a compressor for compressing air, a first heat exchanger arranged to heat compressed air from said compressor using the heat from the combustion gases leaving said duct, an independently fired pre-heater for further pre-heating of the compressed air from said first heat exchanger, which independently fired pre-heater comprises a further heat exchanger, means for passing the air to be heated through said further heat exchanger, and means for burning fuel in air from said compressor and passing the resulting combustion gases through said further heat exchanger, means for feeding the heated air from said further heat exchanger into said combustion chamber and a turbine driven by the combustion gases from said further heat exchanger.

3. The combination as claimed in claim 2 wherein the air from burning fuel in said independently fired pre-heater is heated air from said first heat exchanger.

4. The combination as claimed in claim 2 wherein said further heat exchanger comprises a regenerative heat exchanger of the moving matrix type.

5. The combination as claimed in claim 2 wherein said further heat exchanger comprises a recuperative heat exchanger of the tubular ceramic type.

6. In a magnetohydrodynamic electrical power generating system; the combination of a combustion chamber, means for feeding fuel into said chamber, a magnetohydrodynamic duct through which combustion gases from said combustion chamber are passed, a compressor for compressing air, a first heat exchanger to heat compressed air from said compressor using the heat from the combustion gases leaving said duct, an independently fired pre-heater for further pre-heating of the compressed air from said first heat exchanger, which independently fired pre-heater comprises a further heat exchanger and means for burning fuel in air from said compressor and passing the resulting combustion gases through said further heat exchanger, means for recirculating a controllable proportion of the combustion gases leaving said independently fired pre-heater back to the inlet of that pre-heater so that the gas temperature at the inlet is controllable, and means for feeding the heated air from said further heat exchanger into said combustion chamber.

7. In a magnetohydrodynamic electrical power generating system; the combination of a combustion chamber, means for feeding fuel into said chamber, a magnetohydrodynamic duct through which gases from said combustion chamber are passed, a compressor for compressing air, a first heat exchanger arranged to heat compressed air from said compressor using the heat from the combustion gases leaving said duct, said first heat exchanger being a two-stage air pre-heater with a gas turbine driven by the compressed air passing between the two stages, an independently fired pre-heater for further pre-heating of the compressed air from said first heat exchanger, which independently fired pre-heater comprises a further heat exchanger and means for burning fuel in air from said compression and passing the resulting combustion gases through said further heat exchanger, and means for feeding the heated air from said further heat exchanger into said combustion chamber.

References Cited

UNITED STATES PATENTS 3,007,306  11/1961  Martin _____ 60—38
3,223,860  12/1965  Brill _____ 310—11

DAVID X. SLINEY, *Primary Examiner.*